(12) United States Patent
 Pola

(10) Patent No.: US 9,975,074 B2
(45) Date of Patent: May 22, 2018

(54) FILTERING DEVICE, PARTICULARLY FOR FILTERING AIR CONTAMINATED BY OILY MISTS, VAPORS, AEROSOLS AND THE LIKE

(71) Applicant: LOSMA S.P.A., Curno (IT)

(72) Inventor: Carlo Pola, Lanzo Torinese (IT)

(73) Assignee: LOSMA S.P.A., Curno (IT)

( * ) Notice: Subject to any disclaimer, the term of this patent is extended or adjusted under 35 U.S.C. 154(b) by 180 days.

(21) Appl. No.: 14/907,016

(22) PCT Filed: Jul. 22, 2014

(86) PCT No.: PCT/EP2014/065735
§ 371 (c)(1),
(2) Date: Jan. 22, 2016

(87) PCT Pub. No.: WO2015/011146
PCT Pub. Date: Jan. 29, 2015

(65) Prior Publication Data
US 2016/0158684 A1    Jun. 9, 2016

(30) Foreign Application Priority Data

Jul. 23, 2013 (IT) .............................. MI2013A1231

(51) Int. Cl.
*B01D 46/00*     (2006.01)
*B01D 46/24*     (2006.01)

(52) U.S. Cl.
CPC ..... *B01D 46/0031* (2013.01); *B01D 46/0043* (2013.01); *B01D 46/2403* (2013.01); *B01D 46/2411* (2013.01)

(58) Field of Classification Search
CPC ........ B01D 46/00–46/546; B01D 45/12–45/16
USPC ........................ 95/273–287; 96/186; 55/337, 55/385.1–385.8
See application file for complete search history.

(56) References Cited

U.S. PATENT DOCUMENTS

| 1,107,485 A | 8/1914 | Bowser |
| 4,303,423 A * | 12/1981 | Camplin ................ B01D 45/12 55/294 |
| 5,298,043 A | 3/1994 | Mai et al. |
| 2012/0241369 A1 | 9/2012 | McLane |

FOREIGN PATENT DOCUMENTS

JP        63158253       10/1988
WO    WO 2012167180 A2 *   12/2012    ........... B01D 46/003

OTHER PUBLICATIONS

International Search Report dated Sep. 2, 2014 corresponding to related International Patent Appln. No. PCT/EP2014/065735.
Italian Search Report dated Apr. 29, 2014 corresponding to related Italian Patent Appln. No. MI20131231.

\* cited by examiner

*Primary Examiner* — T. Bennett McKenzie
(74) *Attorney, Agent, or Firm* — Scully, Scott, Murphy & Presser, P.C.

(57) ABSTRACT

A filtering device, particularly for filtering air contaminated by oily mists, vapors, aerosols and the like, comprising a cylindrical containment enclosure that is provided with a closure element that is provided with an air intake, a filtering assembly being accommodated inside the containment enclosure, the device further comprising a conveyance spiral that is arranged axially inside the containment enclosure and in contact with an inner surface of the enclosure.

9 Claims, 7 Drawing Sheets

FILTERING DEVICE, PARTICULARLY FOR FILTERING AIR CONTAMINATED BY OILY MISTS, VAPORS, AEROSOLS AND THE LIKE

CROSS-REFERENCE TO RELATED APPLICATIONS

This Application is a 371 of International Application PCT/EP2014/0657354, filed on Jul. 22, 2014, which claims priority to Application MI2013A001231 filed on Jul. 23, 2013.

BACKGROUND OF THE DISCLOSURE

The present invention relates to a filtering device, particularly for filtering air contaminated by oily mists, vapors, aerosols and the like. More particularly, the invention relates to a filtering device for application where it is necessary to filter air contaminated by solid particles, liquids, fumes, mists, vapors, aerosols, and the like.

As is known, for the filtration of air contaminated by solid particles, liquids, fumes, vapors, aerosols and the like, filtering devices are used. Conventional filtering devices can be adapted to be positioned with a vertical rotation axis, or with a horizontal rotation axis, or they can operate vertically and horizontally without distinction.

Conventional devices are made in a very complex manner and therefore are particularly costly.

The complexity of conventional filtering devices render normal maintenance activities difficult and lengthy.

BRIEF SUMMARY OF THE DISCLOSURE

The aim of the present invention is to provide a filtering device, particularly for filtering air polluted by solid particles, liquids, mists, fumes, vapors, aerosols, and the like, which is simple in construction and therefore has maintenance that is simplified and low cost.

Within this aim, an object of the present invention is to provide a filtering device that can be made at low cost but which, at the same time, ensures an optimal functionality.

This aim and these and other objects which will become better apparent hereinafter are all achieved by a filtering device, particularly for filtering air contaminated by oily mists, vapors, aerosols and the like, comprising a cylindrical containment enclosure that is provided with a closure element that is provided with an air intake, a filtering assembly being accommodated inside said containment enclosure, characterized in that it comprises a conveyance spiral that is arranged axially inside said containment enclosure and in contact with the inner surface of the enclosure.

Further characteristics and advantages of the invention will become better apparent from the description of a preferred, but not exclusive, embodiment of the filtering device according to the present invention, which is illustrated by way of non-limiting example in the accompanying drawings wherein:

DETAILED DESCRIPTION OF THE DISCLOSURE

Figure 1:
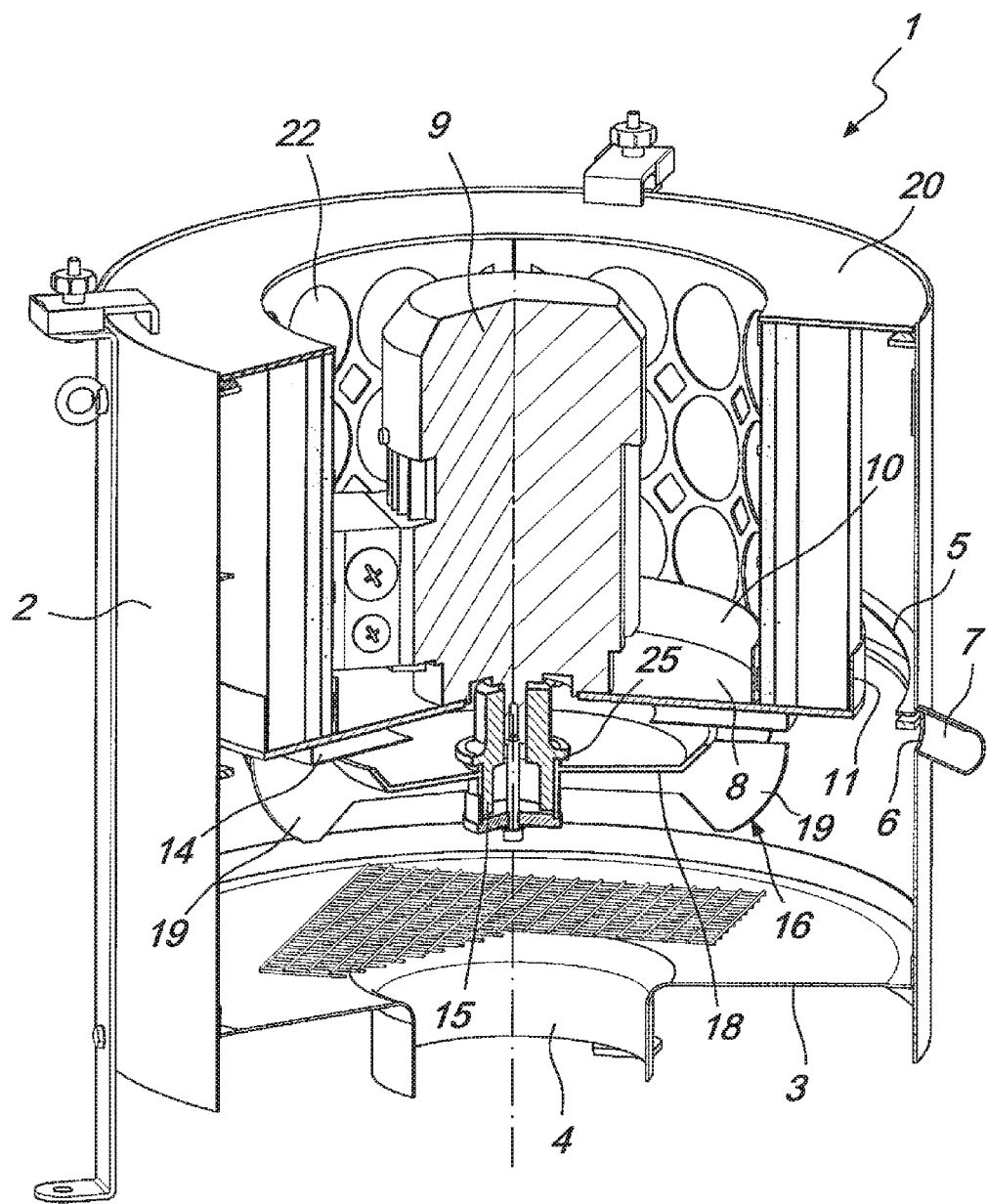
FIG. 1 is a sectional cutaway perspective view of the filtering device according to the present invention.
Figure 2:
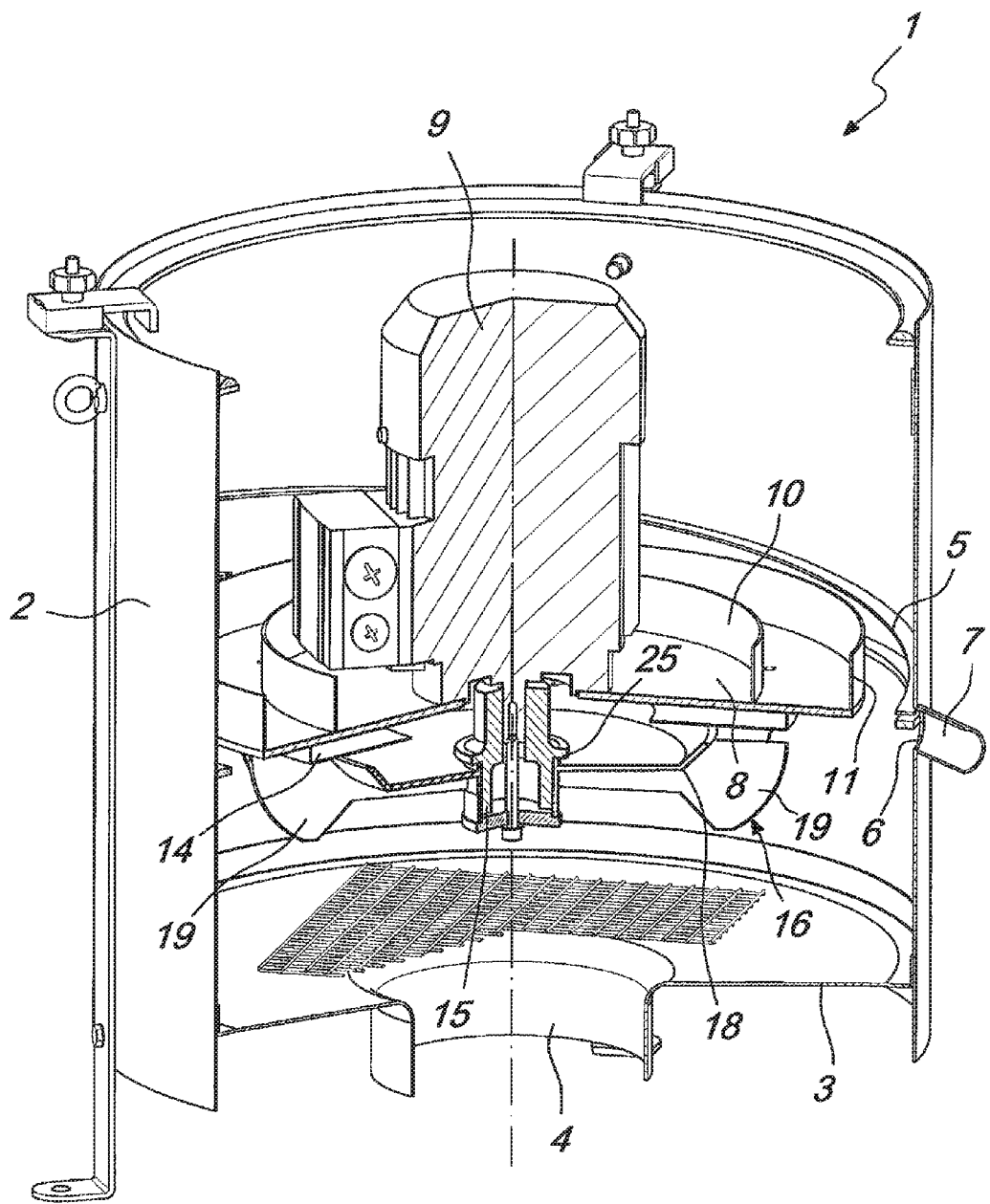
FIG. 2 is a sectional cutaway perspective view of the filtering device according to the invention, without the filtering part.
Figure 3:
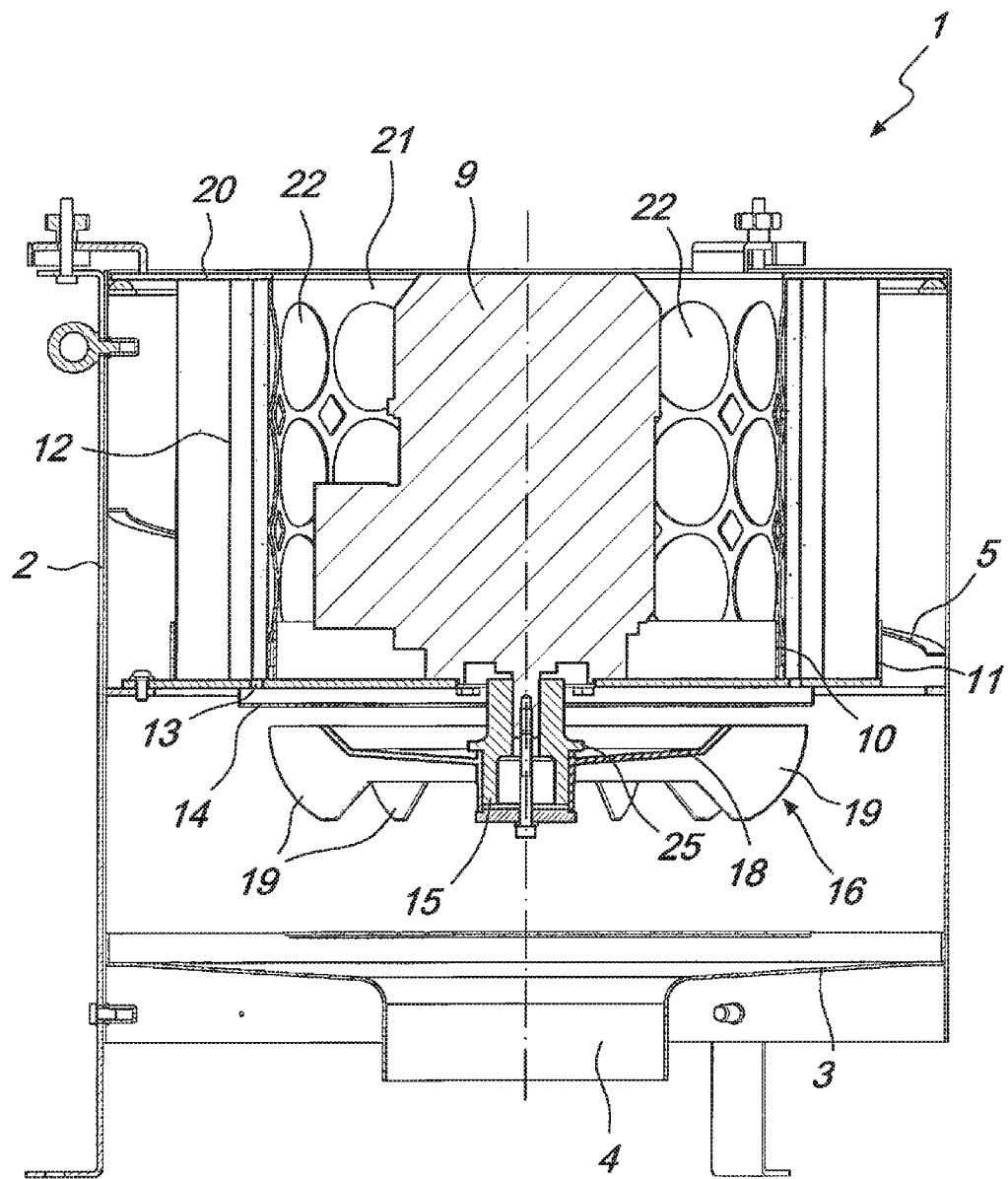
FIG. 3 is a longitudinal cross-sectional view of the filtering device according to the present invention.

With reference to the figures, the filtering device according to the present invention, generally designated by the reference numeral 1, comprises a containment enclosure 2, which is preferably cylindrical, made of metal or of composite materials or of thermoplastic materials, provided with a front closure element 3 and with an air intake 4 that is arranged at the front closure element 3.

The container body internally accommodates a conveyance spiral 5 that is made, for example, of metal, of composite materials or of thermoplastic materials, and has the shape of an inclined plane, and is arranged in direct contact with the inner surface of the enclosure 2. The conveyance spiral 5 has a path that goes from above downwardly, and begins at the air discharge region, which is opposite the intake 4, and ends at a drainage port 6 that connects the environment inside the container 2 to the environment outside it.

The conveyance spiral 5 is formed axially within the containment enclosure 2.

The drainage port 6 is made of metal, or of composite materials or of thermoplastic materials, and can be circular, ellipsoidal, or any other shape or size.

The drainage port 6 is provided with an outlet manifold 7 of the liquid, which can also be of varying shape and size. The drainage port 6 with the corresponding manifold 7 is arranged, as said, at the end part of the conveyance spiral 5.

Figure 4:
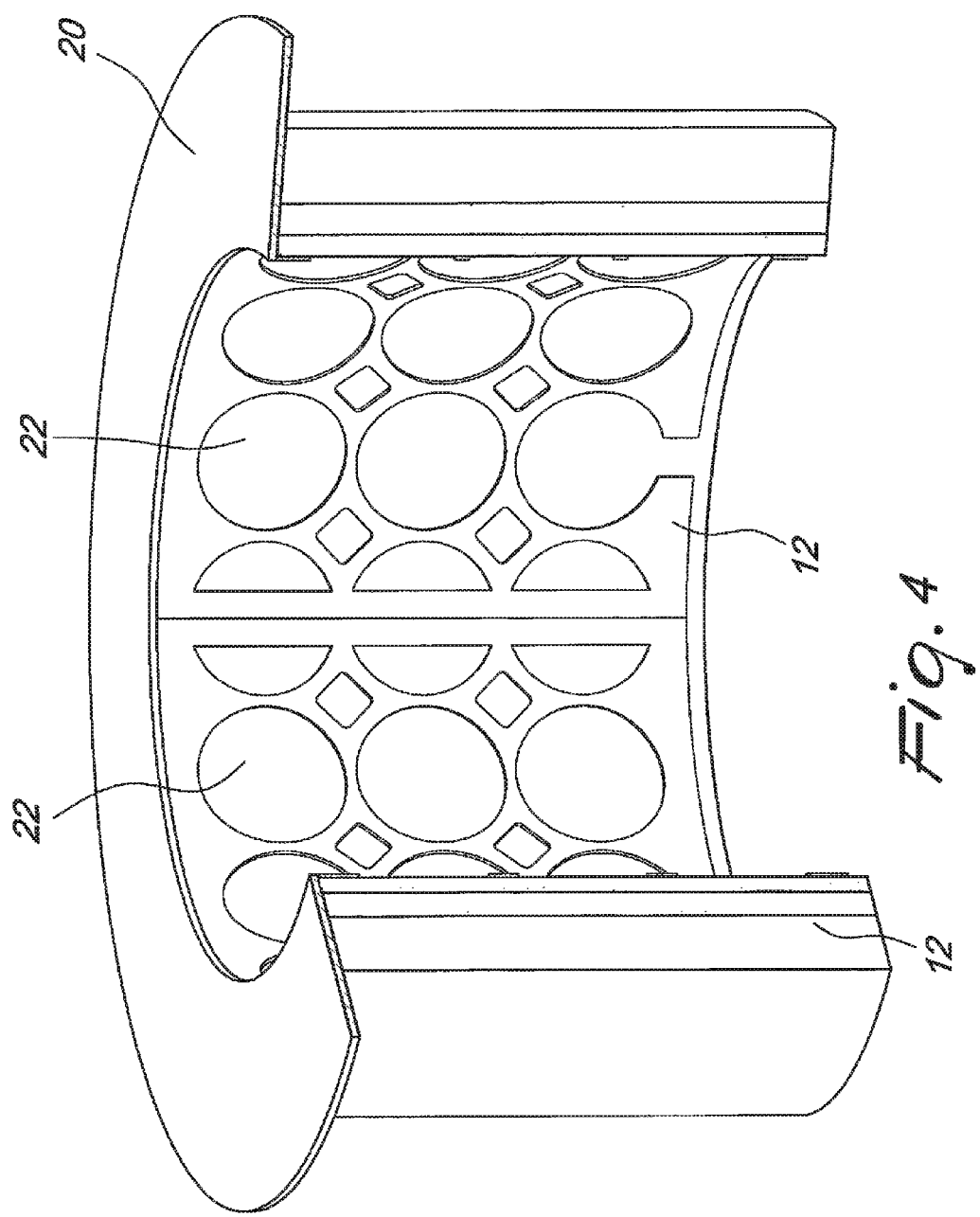
FIG. 4 is a perspective view of the unit comprising the cover with filters of the filtering device according to the present invention.
Figure 5:
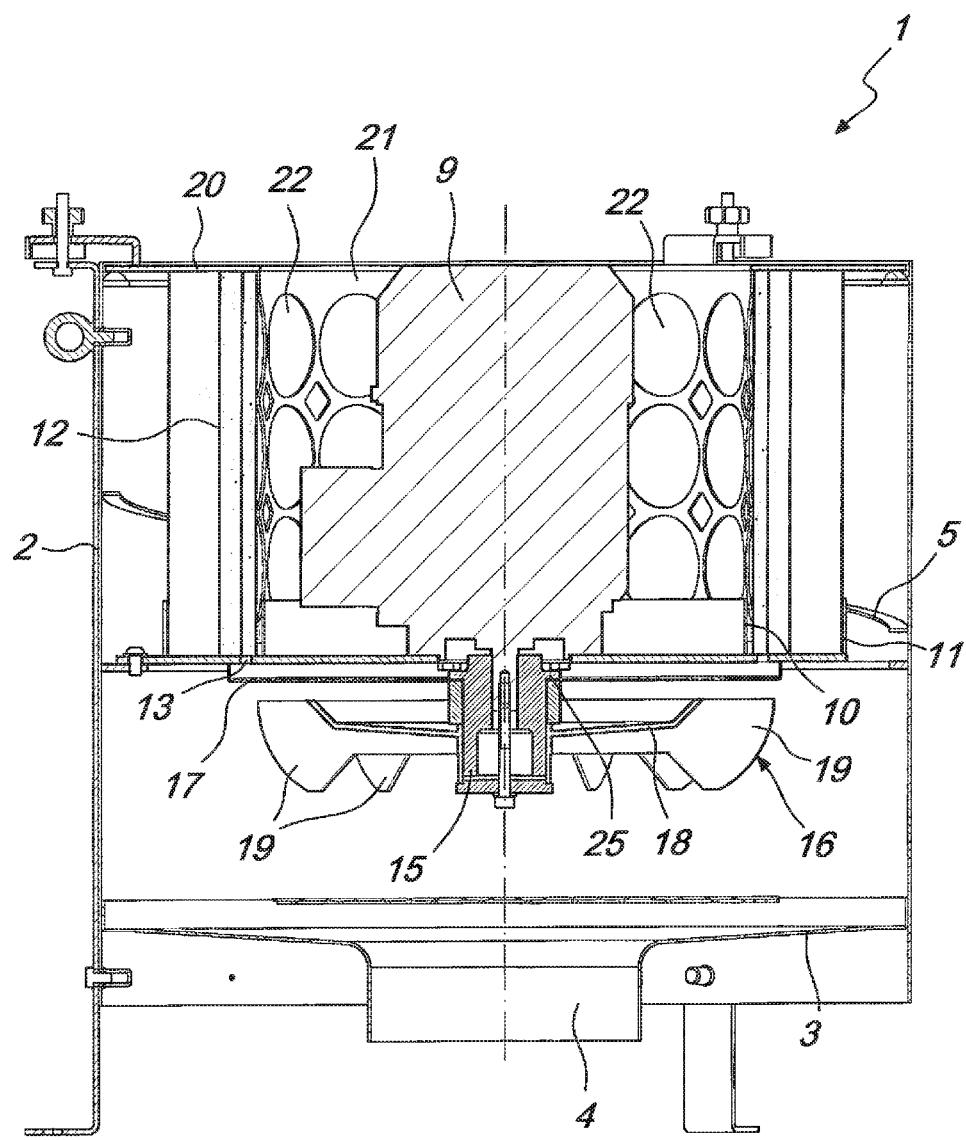
FIG. 5 is a longitudinal cross-sectional view of the filtering device according to the present invention.
Figure 6:
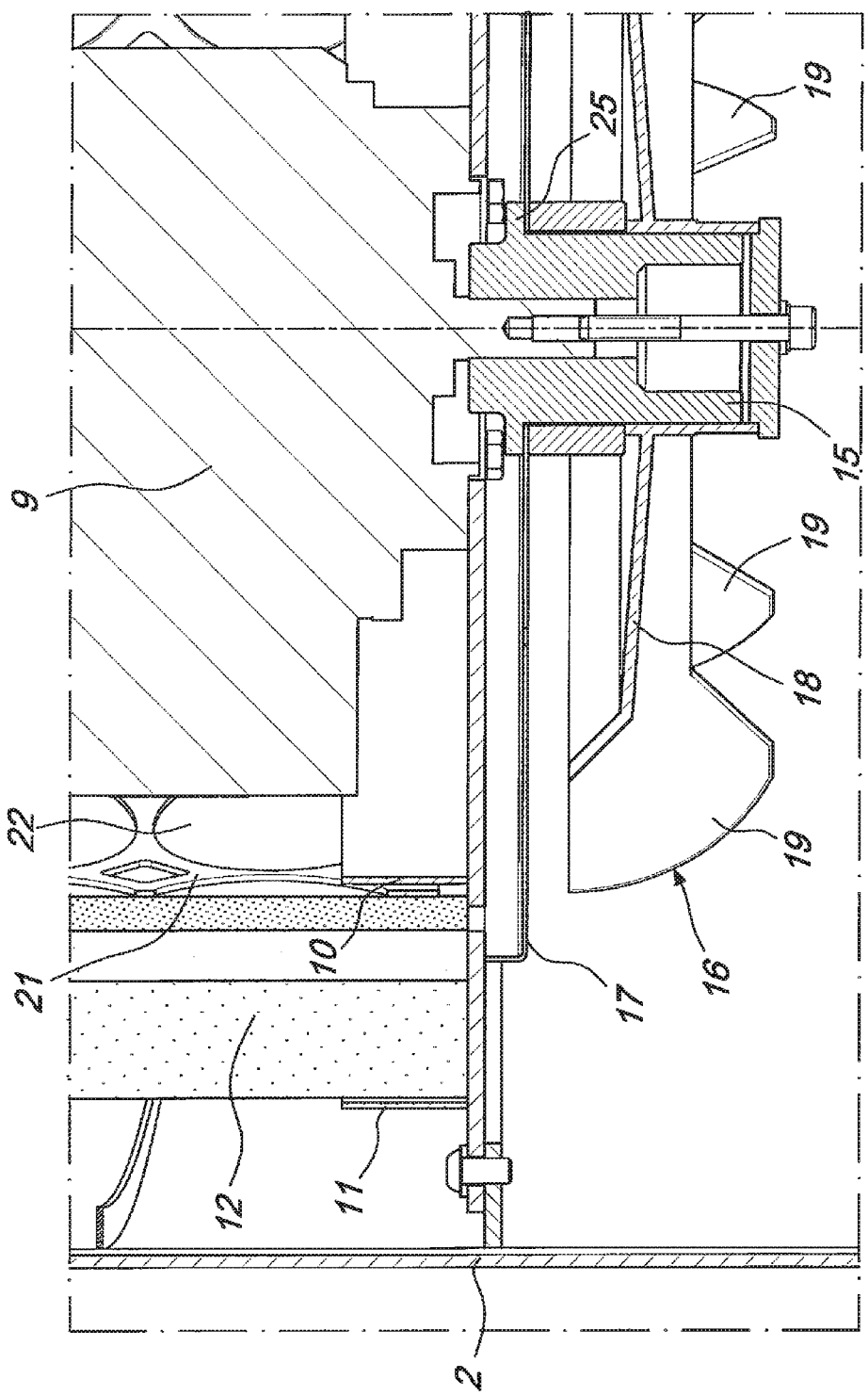
FIG. 6 is a longitudinal cross-sectional view of the filtering device according to the present invention with further details in respect of the previous longitudinal cross-sections.
Figure 7:
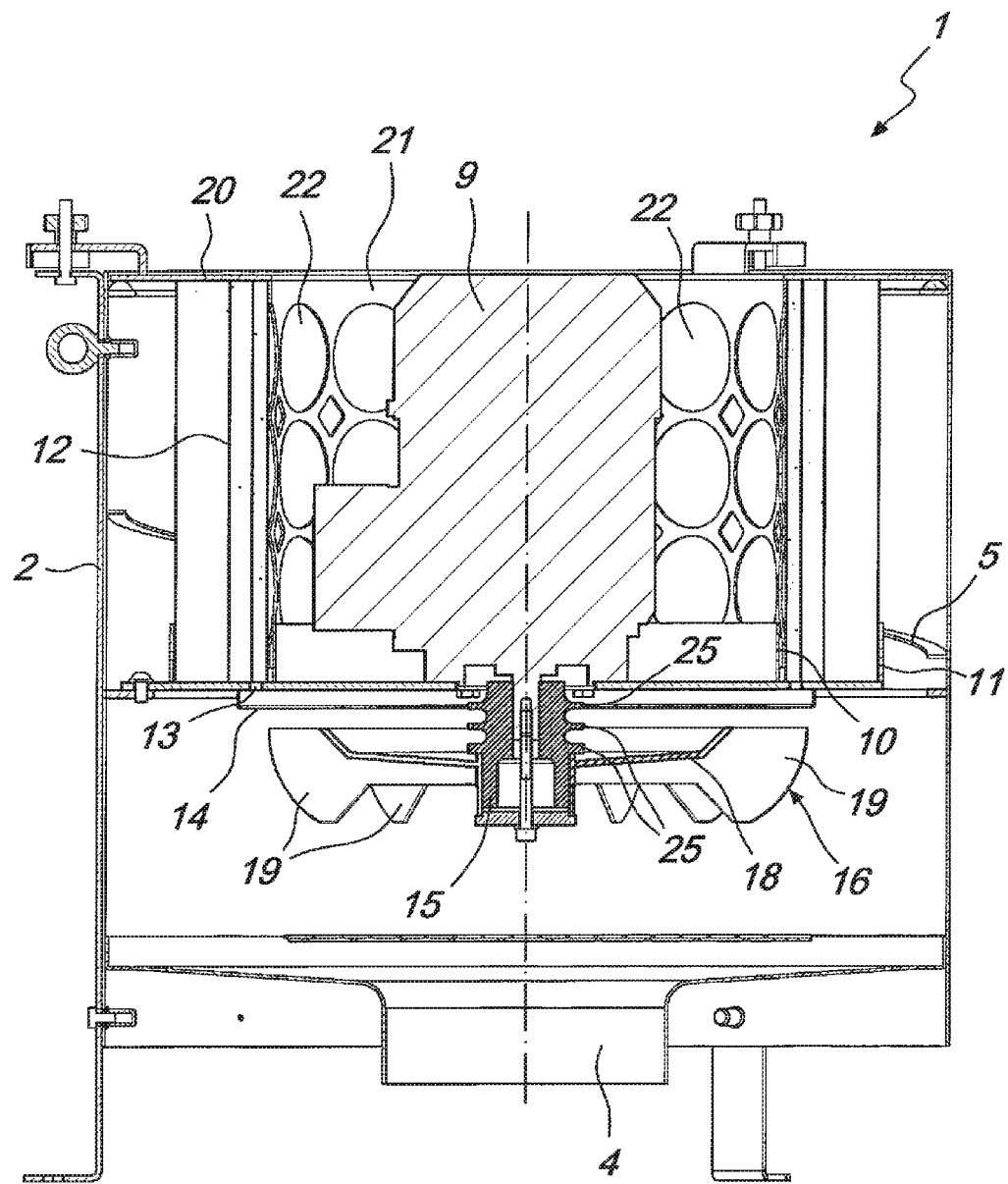
FIG. 7 is a cross-sectional view of a detail of the discharge hole and of the reduced-pressure chamber.

The containment enclosure 2 accommodates an element 8 for supporting an electric motor 9. The supporting element 8 of the motor 9 is provided with a first and second ring, respectively 10 and 11, which are adapted to define a circumferential space that makes it possible to accommodate the filtering assembly constituted by filters 12, as better illustrated in FIG. 4.

The inner ring 10 and the outer ring 11 are provided by two bands that are arranged vertically with respect to the element 8 for supporting the motor 9.

The function of the outer ring 11 is to externally contain the filtering assembly 12, to prevent the inflow of separated liquids, and to direct the flow of air upwardly.

The function of the inner ring 10 is to internally contain the filtering assembly 12, to contain liquids separated by the filtering assembly 12, and to prevent the outflow of separated liquids.

Between the inner ring 10 and the outer ring 11, at the element 8 for supporting the electric motor 9, discharge holes 13 of varying sizes are provided, for discharging the liquids separated by the filters 12.

In a position that lies below the supporting element 8 of the motor 9 a reduced-pressure diaphragm 14 is provided that forms a reduced-pressure chamber, below the element 8 of the electric motor 9, which is a region of reduced pressure at the discharge holes 13.

The reduced-pressure chamber causes a discharge of the liquids that accumulate on the supporting element 8 between the inner ring and the outer ring 10 and 11.

The reduced-pressure diaphragm 14 has a central hole through which passes the hub 15 of a fan 16 that is actuated by the electric motor 9.

Around the hub 15 there can also be a disk-like element 17 made of metal or of composite materials or of thermoplastic materials, which is integral with the rotating part that is made to rotate by the motor 9. The function of the disk 17 is to adjust the value of the reduced pressure inside the reduced-pressure chamber.

The hub 15 can be made of metal or of composite materials or of thermoplastic materials, with flow separation valves, and can have one or more protrusions 25 which are positioned so as to create a barrier to the reascent of any accumulated liquids. The hub 15 makes it possible to generate a centrifugal movement of the air which increases the local pressure reduction and acts as transmission element between the fan 16 and the electric motor 9.

The fan 16 is in turn provided with a central disk 18 and with radial vanes 19. The fan 16 is arranged proximate to the intake 4.

The container 1 is further provided with a disk-like closure element, or cover, 20, which is provided with a cylindrical sector 21 the function of which is to contain the filtering assembly 12, and is provided with openings 22 which can vary in number and position, for the outflow of the filtered air.

The filtering assembly 12 comprises filters that can be made with specific materials and dimensions for the particular applications.

Operation of the device according to the invention is as follows.

Air enters from the intake 4 and is subjected to a first centrifugation step. During this step a separation occurs between liquid and solid particles.

Thereafter the air exits from the region of the fan 16 and goes upward with a vorticous movement.

This condition further facilitates the separation of the particles that are suspended in the air.

The pressure that is created against the walls of the device has the effect of stratifying the liquid droplets that are separated.

In order to avoid that those droplets accumulate, they encounter the spiral 5 that collects them and guides them toward the drainage port 6.

The air that has undergone this depuration process passes through the filtering assembly 12 and in its movement toward the exit passes through the electric motor 9 cooling it.

In practice it has been found that the filtering device according to the present invention fully achieves the set aim and objects.

The filtering device, thus conceived, is susceptible of numerous modifications and variations, all of which are within the scope of the appended claims.

In practice the materials employed, and the contingent dimensions and shapes, may be any according to requirements and to the state of the art.

The disclosures in Italian Patent Application No. MI2013A001231 from which this application claims priority are incorporated herein by reference.

The invention claimed is:

1. A filtering device, comprising a cylindrical containment enclosure that is provided with a closure element that is provided with an axial air intake, a cylindrical filtering assembly being accommodated inside said containment enclosure configured to be radially passed through by contaminated air, and an axial air discharge region opposite to the air intake, further comprising a conveyance spiral that is arranged axially inside said containment enclosure and in contact with the inner surface of the enclosure upstream of the filtering assembly, said conveyance spiral configured to collect and guide liquid droplets separated from the contaminated air beginning at said air discharge region and ending at a drainage port that connects an environment inside the containment enclosure to an environment outside the containment enclosure for draining the liquid droplets.

2. The filtering device according to claim 1, wherein said containment enclosure comprises a supporting element configured to support an electric motor, said supporting element comprising a first ring and a second ring, which are adapted to define a circumferential space for accommodating said filtering assembly.

3. The filtering device according to claim 2, further comprising, in a position that lies below said supporting element, a reduced-pressure diaphragm that is adapted to form a chamber at a reduced pressure below said supporting element.

4. The filtering device according to claim 2, further comprising, between said first and second rings, at the supporting element, discharge holes for discharging the liquids separated by the filtering assembly.

5. The filtering device according to claim 3, wherein said reduced-pressure diaphragm is provided with a hole, the hole configured to allow a hub of a fan, which is actuated by said electric motor, to pass therethrough.

6. The filtering device according to claim 5, further comprising, a disk-like element that is configured to extend around a hub of a fan, the disk-like element is adapted to adjust the value of the reduced pressure inside said reduced-pressure chamber.

7. The filtering device according to claim 5, further comprising a fan, wherein said fan is provided with a central disk and with radial vanes.

8. The filtering device according to claim 5, further comprising a fan, wherein said fan is arranged proximate to said intake.

9. The filtering device according to claim 1, further comprising an additional closure element, which is arranged opposite said closure element and is provided with a cylindrical sector that is adapted to contain said filtering assembly, said additional closure element being provided with openings for an outflow of the filtered air.

\* \* \* \* \*